(12) United States Patent
Fulcheri et al.

(10) Patent No.: US 7,966,432 B2
(45) Date of Patent: Jun. 21, 2011

(54) DATA PROCESSING DEVICE ADAPTABLE TO VARIABLE EXTERNAL MEMORY SIZE AND ENDIANESS

(75) Inventors: Patrick Fulcheri, Antibes (FR); Francois Chancel, Cannes (FR)

(73) Assignee: ST—Ericsson SA, Geneva (CH)

( * ) Notice: Subject to any disclaimer, the term of this patent is extended or adjusted under 35 U.S.C. 154(b) by 545 days.

(21) Appl. No.: 11/572,909

(22) PCT Filed: Jul. 19, 2005

(86) PCT No.: PCT/IB2005/052402
§ 371 (c)(1), (2), (4) Date: Oct. 23, 2008

(87) PCT Pub. No.: WO2006/013498
PCT Pub. Date: Feb. 9, 2006

(65) Prior Publication Data
US 2009/0119438 A1 May 7, 2009

(51) Int. Cl.
G06F 3/00 (2006.01)
G06F 12/00 (2006.01)
(52) U.S. Cl. .......................... 710/26; 711/218
(58) Field of Classification Search .............. 710/8–10, 710/26, 33–36, 60, 104, 105; 711/202, 212, 711/218, 170, 171
See application file for complete search history.

(56) References Cited

U.S. PATENT DOCUMENTS 5,408,664 A * 4/1995 Zarrin et al. ............... 713/2
(Continued)

FOREIGN PATENT DOCUMENTS

EP 0695998 A2 2/1996
(Continued)

OTHER PUBLICATIONS

Endianness White Paper, Intel, Nov. 15, 2004.*

*Primary Examiner* — Khanh Dang
(74) *Attorney, Agent, or Firm* — William J. Kubida; Peter J. Meza; Hogan Lovells US LLP

(57) ABSTRACT

A data processing device (D) comprises an external memory (EM) for storing data defining at least part of a program in an Endian form, and an integrated circuit (IC), connected to the external memory (EM), via a memory bus (MB) having an N-bit width, and comprising i) an embedded processor (EP) adapted to run the program, ii) an internal memory (IM) for storing at least a bootstrap code of this program, iii) an external memory interface (EMI) connected to the memory bus (MB), and iv) a processor bus (PB) connecting the internal memory (IM) and the external memory interface (EMI) to the embedded processor (EP). The external memory (EM) also stores, at a chosen address, an N-bit data word (C) having a value representative of its size (equal to N/8 bits) and of the Endian form of the stored program data. The data processing device (D) also comprises a configuration means (CM) coupled to the embedded processor (EP) and to the external memory interface (EMI) and arranged to deduce from at least one part of 8 bits of this N-bit data word (C), read by the external memory interface at the chosen address of the external memory (EM), the size and the Endian form of storage of the external memory, and to set the width of the external memory interface (EMI) according to the deduced external memory size and the data processing mode of the embedded processor (EP) according to the deduced Endian form of storage.

19 Claims, 3 Drawing Sheets

U.S. PATENT DOCUMENTS

| | | | |
|---|---|---|---|
| 5,603,048 A * | 2/1997 | Shindo et al. | 710/307 |
| 5,613,078 A * | 3/1997 | Kishigami | 710/307 |
| 5,630,099 A * | 5/1997 | MacDonald et al. | 711/172 |
| 5,634,013 A | 5/1997 | Childers et al. | |
| 5,819,283 A | 10/1998 | Turkowski | |
| 5,903,779 A * | 5/1999 | Park | 712/300 |
| 5,907,865 A * | 5/1999 | Moyer | 711/201 |
| 5,909,557 A * | 6/1999 | Betker et al. | 710/104 |
| 6,226,736 B1 * | 5/2001 | Niot | 712/38 |
| 6,625,727 B1 * | 9/2003 | Moyer et al. | 713/1 |
| 6,760,829 B2 * | 7/2004 | Lasserre et al. | 711/207 |
| 6,895,489 B2 * | 5/2005 | Qureshi et al. | 711/202 |
| 6,944,747 B2 * | 9/2005 | Nair et al. | 712/35 |
| 7,139,905 B2 * | 11/2006 | Filer et al. | 712/300 |
| 7,162,563 B2 * | 1/2007 | Matsui et al. | 710/307 |
| 7,389,404 B2 * | 6/2008 | Nair et al. | 712/35 |
| 7,587,557 B2 * | 9/2009 | Funahashi et al. | 711/147 |
| 2004/0030856 A1 | 2/2004 | Qureshi et al. | |

FOREIGN PATENT DOCUMENTS

EP 1150214 A1 10/2001

* cited by examiner

DATA PROCESSING DEVICE ADAPTABLE TO VARIABLE EXTERNAL MEMORY SIZE AND ENDIANESS

FIELD OF THE INVENTION

The present invention relates to data processing device comprising an integrated circuit connected to an external memory via a memory bus.

Certain data processing devices comprise an external memory, storing data defining at least a part of a program in an Endian form, and an integrated circuit connected to this external memory, via a memory bus having an N-bit width, and comprising an embedded processor running this stored program, an internal memory storing at least a bootstrap code of the program, an external memory interface connected to the memory bus, and a processor bus connecting the internal memory and the external memory interface to the embedded processor.

BACKGROUND OF THE INVENTION

It is recalled that the "Endian form" is a well-known addressing convention comprising the "Little-Endian form", according to which each multi-byte number (or data) is stored with the least significant byte at the lowest address and subsequent bytes at increasing addresses, and the "Big-Endian form", according to which each multi-byte number (or data) is stored with the most significant byte at the lowest address and subsequent bytes at increasing addresses.

As it is known by one skilled in the art, in many integrated circuits comprising an embedded processor, the program memory is not fully embedded due to flexibility (for instance in terms of size and/or performance(s) and/or bus width) and/or to technology limitations (for instance the limited area is not compatible with the required memory size and/or there is no programmable memory available and/or the yield of the embedded programmable memory is too low and/or this requires a bigger silicon area than the external device to control). So only a bootstrap code is generally stored (or embedded) in the non-volatile internal memory (for instance a ROM). The external memory is generally programmable (for instance it is a flash memory).

As the external memory technology continuously evolves, certain manufacturers may need to use different external memory widths to cope with different applications (for instance for the purpose of low costs when a high performance is not required).

Moreover, depending on circumstances the customers may prefer their program to be stored in Little-Endian or Big-Endian form in the external memory.

To allow a selection of the operation mode of the embedded processor, many data processing devices comprise selection pins either connected to ground or to a supply to indicate to the embedded logic of the integrated circuit the configuration of the external memory. But reducing the overall cost implies increasing the number of selection pins, whereas reducing the package size of the data processing device implies that fewer selection pins are available. Therefore, the use of selection pins, exclusively dedicated to static operation mode setting, may be a drawback.

In order to reuse the selection pins, the operation mode may be determined by sampling their voltage (or current) levels during start-up (or reset) phase(s). With such a pin sharing, the selection pins become available for another task than the external memory size and/or Endian form designation(s). But, both internal logic and external components are required to force the state of the pins during the start-up phase, to latch the levels when the reset becomes inactive and to release the levels for normal operations. Pull-up or pull-down resistors may be used for this purpose, but they may create a leakage current during the device operation(s), which is generally not compatible with the requirements of the battery-powered equipment in which they are installed.

Some other more complex sharing solutions have been proposed, but they lead to more implementation difficulties.

SUMMARY OF THE INVENTION

So, the object of this invention is to improve the situation, and more precisely to avoid the use of dedicated selection pins for external memory size (or width) and Endianess designations.

For this purpose, it provides a data processing device comprising an external memory for storing data defining at least a part of a program in an Endian form, and an integrated circuit connected to the external memory, via a memory bus having an N-bit width, and comprising i) an embedded processor adapted to run with the program, ii) an internal memory for storing at least a bootstrap code of this program, iii) an external memory interface connected to the memory bus, and iv) a processor bus connecting the internal memory and the external memory interface to the embedded processor.

This data processing device is characterized in that its external memory is arranged to store, at a chosen address, an N-bit data word having a value representative of its size (equal to N/8 bits) and of the Endian form of the stored program data, and in that it also comprises a configuration means coupled to the embedded processor and to the external memory interface and arranged to deduce from at least one part of 8 bits of this N-bit data word, read by the external memory interface at the chosen address of the external memory, the size and the Endian form of storage of the external memory, and to set the width of the external memory interface according to the deduced external memory size and the data processing mode of the embedded processor according to the deduced Endian form of storage.

The data processing device according to the invention may include additional characteristics considered separately or in combination, and notably:

- its configuration means may be arranged to control the external memory interface to preset it to an 8-bit width in order for the interface to access the external memory at the chosen address to read the part(s) of 8 bits of the stored N-bit data word,
- its configuration means may be arranged to preset in Little-Endian form the data processing mode of the embedded processor before reading of the N-bit data word in the external memory. In this case the configuration means is preferably arranged either to confirm the presetting of the data processing mode of the embedded processor in Little-Endian form when the deduced Endian form of storage is Little-Endian, or to set the data processing mode of the embedded processor in Big-Endian form when the deduced Endian form of storage is Big-Endian,
- its configuration means may be arranged to preset in Big-Endian form the data processing mode of the embedded processor before reading of the N-bit data word in the external memory. In this case the configuration means is preferably arranged either to confirm the presetting of the data processing mode of the embedded processor in Big-Endian form when the deduced Endian form of storage is Big-Endian or to set the data processing mode of the embedded processor in Little-Endian form when the deduced Endian form of storage is Little-Endian, its configuration means may be arranged to generate N/8 8-bit accesses to the external memory at consecutive addresses starting from the chosen address to read at least the part of the N-bit data word, and the embedded processor may comprise a dedicated memory having a size equal to N and arranged to store each read part of the N-bit data word at N/8 consecutive addresses, when N is equal to 32 and the external memory size is equal to 32, the configuration means is preferably arranged to generate four 8-bit accesses to the external memory at four consecutive addresses starting from the chosen address to read a first part of the N-bit data word four times, and the dedicated memory is arranged to store the read first part of the N-bit data word in first, second, third and fourth consecutive addresses of the dedicated memory, whatever the deduced Endian form, when N is equal to 32 and the external memory size is equal to 16, the configuration means is preferably arranged to generate four 8-bit accesses to said external memory at four consecutive addresses starting from the chosen address to read a first part and a third part of the N-bit data word two times, and the dedicated memory is preferably arranged to store either the first read part at first and second consecutive addresses of the dedicated memory and the third read part at third and fourth consecutive addresses of the dedicated memory when the deduced Endian form of storage is Little-Endian, or the third read part at first and second consecutive addresses of the dedicated memory and the first read part at third and fourth consecutive addresses of the dedicated memory, when said deduced Endian form of storage is Big-Endian, when N is equal to 32 and the external memory size is equal to 8, the configuration means is preferably arranged to generate four 8-bit accesses to the external memory at four consecutive addresses starting from the chosen address to read first, second, third and fourth consecutive parts of the N-bit data word, and the dedicated memory is preferably arranged to store either the first, second, third and fourth parts respectively at first, second, third and fourth consecutive addresses of the dedicated memory when the deduced Endian form of storage is Little-Endian, or the first, second, third and fourth parts respectively at the fourth, third, second and first addresses of the dedicated memory, when the deduced Endian form of storage is Big-Endian.

The invention also provides a mobile phone comprising a data processing device such as the one introduced above.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also to contribute to its definition, if need be.

PREFERRED EMBODIMENTS OF THE INVENTION

Figure 1:
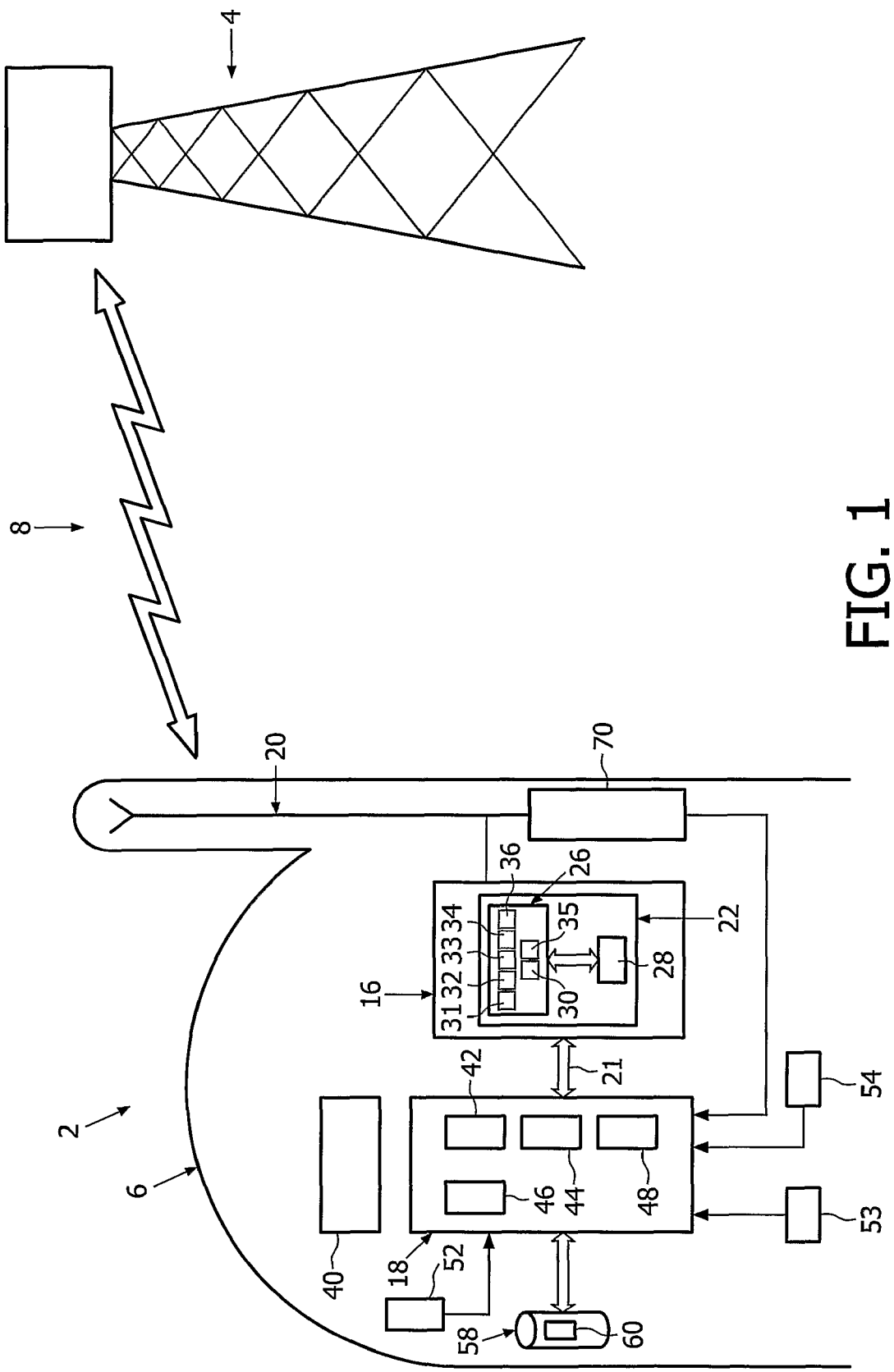
FIG. 1 schematically illustrates an example of a data processing device according to the invention, FIG. 2, A to C schematically illustrates 3 examples of dedicated memory (DM) and external memory (EM) of a data processing device according to the invention, when the external memory sizes are respectively equal to 32 bits, 16 bits and 8 bits, and FIG. 3 schematically illustrates an example of decision algorithm for a data processing device according to the invention.

Reference is initially made to FIG. 1 to describe a non limiting example of embodiment of a data processing device D according to the invention.

In the following description it will be considered that the illustrated data processing device D is installed in a mobile phone. But it may be installed in any open equipment (or system), and notably in a micro-controller, a PDA ("Personal Digital Assistant"), a TV set top box, or a Personal Computer peripheral.

Moreover, in the following description it will be considered that the illustrated data processing device D is arranged to control at least a mobile telephony application (X). But it may be arranged to control any other application.

As is illustrated in FIG. 1, the data processing device D according to the invention comprises at least an external memory EM having a N-bit size, and an integrated circuit IC connected to the external memory EM via a memory bus MB having an N-bit width.

The external memory EM is arranged to store, in an Endian form, data (or multi-byte numbers) defining at least part of a program defining an application X, and an N-bit data word C whose value is stored at a chosen address A and is representative of the external memory size equal to N/8 bits and of the Endian form of the stored program data. For instance, N is equal to 32 and the size of the external memory EM is equal to 8 bits (but it could be equal to 16 bits, or 32 bits, or else 64 bits, and more generally to m×8 bits, with m≧1). This external memory EM is programmable. For instance, it may be a flash memory.

The integrated circuit IC comprises an embedded processor EP which is adapted to run with the program mentioned above, an internal memory IM which is arranged to store at least a bootstrap code of this program, an external memory interface EMI which is notably connected to the memory bus MB, and a processor bus PB for connecting the internal memory IM and the external memory interface EMI to the embedded processor EP.

For instance, the width of the processor bus PB is equal to 32 bits, but other values may be envisaged, and notably 16 bits or 64 bits, or else 128 bits.

The bootstrap code is provided for executing a decision algorithm, which aims at determining the mode of operation of the integrated circuit IC and will be described below.

For instance the internal memory IM is a read only memory (ROM), but other types of non-volatile memories may be envisaged and notably an embedded flash memory or a magnetic memory.

The data processing device D also comprises a configuration module CM, which is coupled to the embedded processor EP and to the external memory interface EMI.

This configuration module CM is notably arranged to deduce from at least one part of 8 bits of the N-bit data word C, which can be read by the external memory interface EMI at the chosen address A of the external memory EM, the size and the Endian form of storage of the external memory EM.

More precisely, when the bootstrap code has been activated, the configuration module CM orders the external memory interface EMI to access the external memory EM at the chosen address A, via the memory bus MB, in order to read one or more 8-bit parts of the stored word C. For this purpose the configuration module CM generates N/8 8-bit accesses to the external memory EM at consecutive addresses starting from the chosen address A, i.e. A, A+1, A+2, . . . , A+N/8. The number (N/8) of 8-bit parts to be read depends on the value of N and on the external memory size (which is equal to N/8 bits). So it can be equal to 1, 2, or else 4, or even more.

When the configuration module CM has deduced the size and the Endian form of storage of the external memory EM from the read 8-bit part(s) of the stored word C, it can set the width of the external memory interface EMI according to this deduced external memory size and, thereafter, the data processing mode of the embedded processor EP according to this deduced Endian form of storage.

The embedded processor EP preferably comprises a dedicated memory DM having a size equal to N in order to store each read part of the N-bit data word C at N/8 consecutive addresses.

Figure 2:
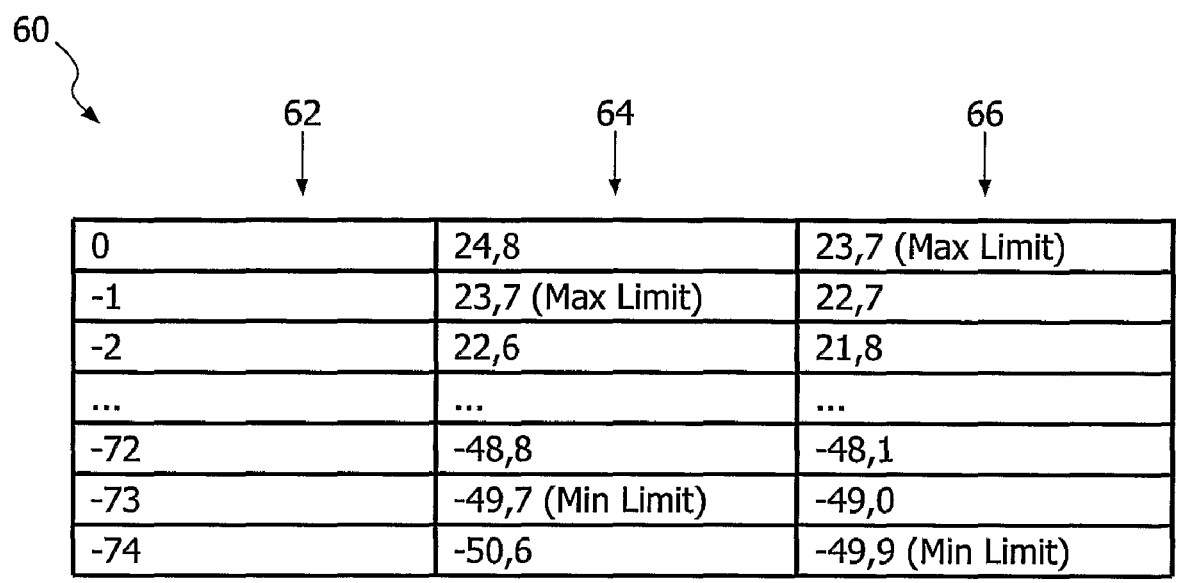

For instance, if N is equal to 32 and the external memory size is equal to 32, the configuration module CM generates four 8-bit accesses to the external memory EM at four consecutive addresses A, A+1, A+2, A+3. N being equal to 32, the word C is stored in the external memory EM in first B0, second B1, third B2 and fourth B3 parts. But N being also equal to the external memory size, all the addresses A, A+1, A+2, A+3 are equivalent. Therefore, only the first part B0 of the word C can be read. So, the dedicated memory DM stores the read first part B0 of the word C at first, second, third and fourth consecutive addresses, whatever the deduced Endian form. This example is schematically illustrated in FIG. 2A.

Now if N is equal to 32 and the external memory size is equal to 16, the configuration module CM still generates four 8-bit accesses to the external memory EM at the four consecutive addresses A, A+1, A+2, A+3. The external memory size being equal to 16, the address A+2 (corresponding to the third part B2 of the word C) is equivalent to the address A (corresponding to the first part B0 of the word C) while the address A+1 (corresponding to the second part B1 of the word C) is equivalent to the address A+3 (corresponding to the fourth part B3 of the word C). Therefore, the first B0 and third B2 parts of the word C are respectively read two times. So, the dedicated memory DM preferably stores either the read first part B0 of the word C at its first and second consecutive addresses and the read third part B2 at its third and fourth consecutive addresses when the deduced Endian form of storage is Little-Endian, or the read third part B2 at its first and second consecutive addresses and the read first part B0 at the third and fourth consecutive addresses when the deduced Endian form of storage is Big-Endian. This example is schematically illustrated in FIG. 2B.

If N is equal to 32 and the external memory size is equal to 8, the configuration module CM still generates four 8-bit accesses to the external memory EM at the four consecutive addresses A, A+1, A+2, A+3. Then the dedicated memory DM stores either the first B0, second B1, third B2 and fourth B3 parts respectively at its first, second, third and fourth consecutive addresses when the deduced Endian form of storage is Little-Endian, or the first B0, second B1, third B2 and fourth B3 parts respectively at its fourth, third, second and first addresses when the deduced Endian form of storage is Big-Endian. This example is schematically illustrated in FIG. 2C.

When the configuration module CM accesses the dedicated memory DM of the embedded processor EP, it can read its content and deduce from it the size and the Endian form of the external memory EM. To allow such a deduction, the configuration module CM may be provided with a table establishing a correspondence between values (stored in the dedicated memory DM) and pairs of size and Endian form.

Figure 3:
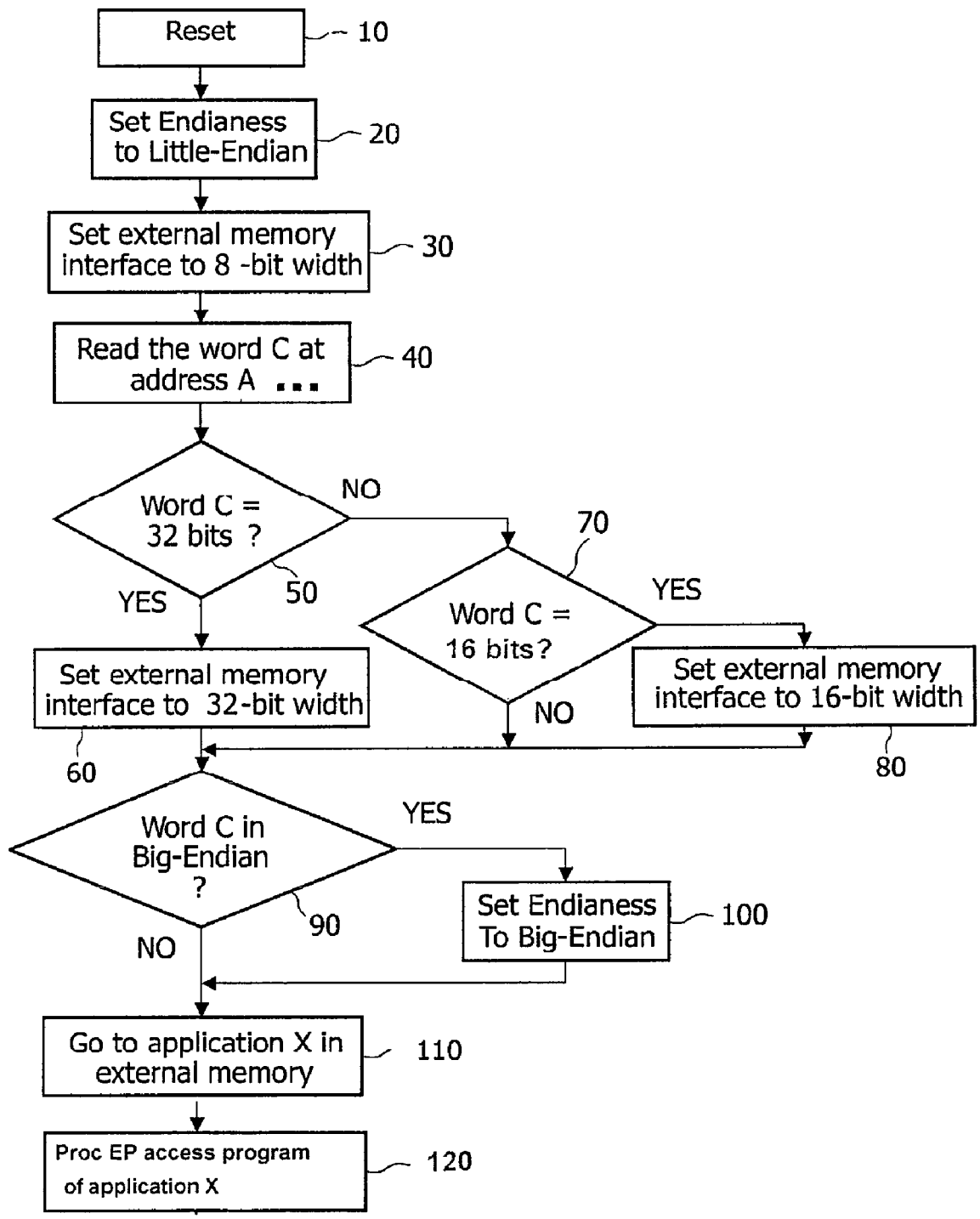

Reference is now made to FIG. 3 to describe an example of decision algorithm for the data processing device D. In this example one still considers that N is equal to 32, but this is not mandatory, as explained before.

This algorithm starts when the bootstrap code, stored in the internal memory IM, is activated by a dedicated command.

In step 10 at least the external memory interface EMI and the content of the dedicated memory DM are reset.

In step 20 the configuration module CM preferably presets the Endianess (or operation mode) of the embedded processor EP to Little-Endian before ordering (the external memory interface EMI) the reading of the N-bit data word C in the external memory EM.

In step 30 the configuration module CM preferably sets the width of the external memory interface EMI to 8 bits for it to access the external memory EM at the chosen address A to read the part(s) of 8 bits of the stored N-bit data word C.

In step 40 the external memory interface EMI accesses the external memory EM, via the memory bus MB, to read the part(s) of 8 bits of the stored N-bit data word C. The external memory interface EMI transmits the read part(s) to the embedded processor EP, via the processor bus BP, for the read part(s) to be stored in the dedicated memory DM. Then the configuration module CM accesses the dedicated memory DM to read its content and deduce the size and the Endian form of the external memory EM.

In step 50 the configuration module CM compares the deduced size to 32 bits.

If the deduced size is equal to 32 bits, the configuration module CM sets the width of the external memory interface EMI to 32 bits in a step 60, and then step 90 is proceeded to.

If the deduced size is not equal to 32, bits the configuration module CM compares it to 16 bits in step 70. If the deduced size is equal to 16, bits the configuration module CM sets the width of the external memory interface EMI to 16 bits in step 80, and then step 90 is proceeded to. If the deduced size is not equal to 16 bits, the configuration module CM deduces that it is equal to 8 bits. Therefore, it does not have to change the width of the external memory interface EMI (which is equivalent to confirming the Endianess presetting made in step 20), and step 90 is proceeded to.

In step 90 the configuration module CM compares the deduced Endian form to Big-Endian.

If the deduced Endian form is not equal to Big-Endian, the configuration module CM deduces that the Endian form of the external memory EM is Little-Endian. Therefore, it does not have to change the operation mode (or Endianess) of the embedded processor EP (preset in step 20), and then step 110 is proceeded to.

If the deduced Endian form is equal to Big-Endian, the configuration module CM sets the Endianess (or operation mode) of the embedded processor EP to Big-Endian in a step 100, and then step 110 is proceeded to.

Finally, in step 120, the embedded processor EP access the program of the application X, via the processor bus BP, the external memory interface EMI and the memory bus MB, in order to run it.

In step 20 of this algorithm the Endianess of the embedded processor EP is preset to Little-Endian. But in a variant one can preset the Endianess of the embedded processor EP to Big-Endian. In this case, in step 90, the configuration module CM compares the deduced Endian form to Little-Endian, and in step 100 it sets the Endianess (or operation mode) of the embedded processor EP to Little-Endian.

The data processing device D is typically realized with a combination of hardware and software modules.

The invention is not limited to the embodiments of data processing device and mobile phone described above, only as examples, but it encompasses all alternative embodiments which may be considered by one skilled in the art within the scope of the claims hereafter.

The invention claimed is:

1. A data processing device comprising an external memory for storing data defining at least part of a program in an Endian form, and an integrated circuit coupled to said external memory via a memory bus having an N-bit width, and comprising i) an embedded processor adapted to run with said program, ii) an internal memory for storing at least a bootstrap code of said program, iii) an external memory interface coupled to said memory bus and iv) a processor bus coupling said internal memory and said external memory interface to said embedded processor, wherein said external memory is arranged to store, at a chosen address, an N-bit data word having a value representative of its size, equal to N/8 bits, and of the Endian form of the stored program data, and in that it also comprises a configuration means coupled to said embedded processor and to said external memory interface and arranged to deduce from at least one part of 8 bits of said N-bit data word, read by said external memory interface at the chosen address of said external memory, the size and the Endian form of storage of said external memory and to set the width of said external memory interface according to said deduced external memory size and a data processing mode of said embedded processor according to said deduced Endian form of storage, and wherein said configuration means is arranged to generate N/8 8-bit accesses to said external memory at consecutive addresses starting from said chosen address to read at least said one part of said N-bit data word, and in that said embedded processor comprises a dedicated memory having a size equal to N and arranged to store each read part of said N-bit data word at N/8 consecutive addresses.

2. The data processing device according to claim 1, wherein said configuration means is arranged to control said external memory interface to preset it to an 8-bit width in order for the interface to access said external memory at said chosen address to read said part(s) of 8 bits of said stored N-bit data word.

3. The data processing device according to claim 1, wherein said configuration means is arranged to preset in Little-Endian form the data processing mode of said embedded processor before reading of said N-bit data word in said external memory.

4. The data processing device according to claim 3, wherein said configuration means is arranged either to confirm said presetting of the data processing mode of said embedded processor in Little-Endian form when said deduced Endian form of storage is Little-Endian, or to set the data processing mode of said embedded processor in Big-Endian form when said deduced Endian form of storage is Big-Endian.

5. The data processing device according to claim 1, wherein said configuration means is arranged to preset in Big-Endian form the data processing mode of said embedded processor before reading of said N-bit data word in said external memory.

6. The data processing device according to claim 5, wherein said configuration means is arranged either to confirm said presetting of the data processing mode of said embedded processor in Big-Endian form when said deduced Endian form of storage is Big-Endian, or to set the data processing mode of said embedded processor in Little-Endian form when said deduced Endian form of storage is Little-Endian.

7. The data processing device according to claim 1, wherein, when N is equal to 32 and said external memory size is equal to 32, said configuration means is arranged to generate four 8-bit accesses to said external memory at four consecutive addresses starting from said chosen address to read a first part of said N-bit data word four times, and in that said dedicated memory is arranged to store said read first part of said N-bit data word in first, second, third and fourth consecutive addresses, whatever the deduced Endian form.

8. The data processing device according to claim 1, wherein, when N is equal to 32 and said external memory size is equal to 16, said configuration means is arranged to generate four 8-bit accesses to said external memory at four consecutive addresses starting from said chosen address to read a first part and a third part of said N-bit data word two times, and in that said dedicated memory is arranged to store either the read first part at consecutive first and second addresses of the dedicated memory and the read third part at third and fourth consecutive addresses when said deduced Endian form of storage is Little-Endian, or the read third part at first and second consecutive addresses and the read first part at third and fourth consecutive addresses when said deduced Endian form of storage is Big-Endian.

9. The data processing device according to claim 1, wherein, when N is equal to 32 and said external memory size is equal to 8, said configuration means is arranged to generate four 8-bit accesses to said external memory at four consecutive addresses starting from said chosen address to read first, second, third and fourth consecutive parts of said N-bit data word, and in that said dedicated memory is arranged to store either said first, second, third and fourth parts respectively at first, second, third and fourth consecutive addresses when said deduced Endian form of storage is Little-Endian, or said first, second, third and fourth parts respectively at said fourth, third, second and first addresses, when said deduced Endian form of storage is Big-Endian.

10. A mobile phone, comprising in a data processing device comprising an external memory for storing data defining at least part of a program in an Endian form, and an integrated circuit coupled to said external memory via a memory bus having an N-bit width, and comprising i) an embedded processor adapted to run with said program, ii) an internal memory for storing at least a bootstrap code of said program, iii) an external memory interface coupled to said memory bus and iv) a processor bus coupling said internal memory and said external memory interface to said embedded processor, wherein said external memory is arranged to store, at a chosen address, an N-bit data word having a value representative of its size, equal to N/8 bits, and of the Endian form of the stored program data, and in that it also comprises a configuration module coupled to said embedded processor and to said external memory interface and arranged to deduce from at least one part of 8 bits of said N-bit data word, read by said external memory interface at the chosen address of said external memory, the size and the Endian form of storage of said external memory and to set the width of said external memory interface according to said deduced external memory size and a data processing mode of said embedded processor according to said deduced Endian form of storage, and wherein said configuration module is arranged to generate N/8 8-bit accesses to said external memory at consecutive addresses starting from said chosen address to read at least said one part of said N-bit data word, and in that said embedded processor comprises a dedicated memory having a size equal to N and arranged to store each read part of said N-bit data word at N/8 consecutive addresses.

11. The mobile phone according to claim 10, wherein said configuration module is arranged to control said external memory interface to preset it to an 8-bit width in order for the interface to access said external memory at said chosen address to read said part(s) of 8 bits of said stored N-bit data word.

12. The mobile phone according to claim 10, wherein said configuration module is arranged to preset in Little-Endian form the data processing mode of said embedded processor before reading of said N-bit data word in said external memory.

13. The mobile phone according to claim 12, wherein said configuration module is arranged either to confirm said presetting of the data processing mode of said embedded processor in Little-Endian form when said deduced Endian form of storage is Little-Endian, or to set the data processing mode of said embedded processor in Big-Endian form when said deduced Endian form of storage is Big-Endian.

14. The mobile phone according to claim 10, wherein said configuration module is arranged to preset in Big-Endian form the data processing mode of said embedded processor before reading of said N-bit data word in said external memory.

15. The mobile phone according to claim 14, wherein said configuration module is arranged either to confirm said presetting of the data processing mode of said embedded processor in Big-Endian form when said deduced Endian form of storage is Big-Endian, or to set the data processing mode of said embedded processor in Little-Endian form when said deduced Endian form of storage is Little-Endian.

16. The mobile phone according to claim 10, wherein, when N is equal to 32 and said external memory size is equal to 32, said configuration module is arranged to generate four 8-bit accesses to said external memory at four consecutive addresses starting from said chosen address to read a first part of said N-bit data word four times, and in that said dedicated memory is arranged to store said read first part of said N-bit data word in first, second, third and fourth consecutive addresses, whatever the deduced Endian form.

17. The mobile phone according to claim 10, wherein, when N is equal to 32 and said external memory size is equal to 16, said configuration module is arranged to generate four 8-bit accesses to said external memory at four consecutive addresses starting from said chosen address to read a first part and a third part of said N-bit data word two times, and in that said dedicated memory is arranged to store either the read first part at consecutive first and second addresses of the dedicated memory and the read third part at third and fourth consecutive addresses when said deduced Endian form of storage is Little-Endian, or the read third part at first and second consecutive addresses and the read first part at third and fourth consecutive addresses when said deduced Endian form of storage is Big-Endian.

18. The mobile phone according to claim 10, wherein, when N is equal to 32 and said external memory size is equal to 8, said configuration module is arranged to generate four 8-bit accesses to said external memory at four consecutive addresses starting from said chosen address to read first, second, third and fourth consecutive parts of said N-bit data word, and in that said dedicated memory is arranged to store either said first, second, third and fourth parts respectively at first, second, third and fourth consecutive addresses when said deduced Endian form of storage is Little-Endian, or said first, second, third and fourth parts respectively at said fourth, third, second and first addresses, when said deduced Endian form of storage is Big-Endian.

19. A data processing device comprising an external memory for storing data defining at least part of a program in an Endian form, and an integrated circuit coupled to said external memory via a memory bus having an N-bit width, and comprising i) an embedded processor adapted to run with said program, ii) an internal memory for storing at least a bootstrap code of said program, iii) an external memory interface coupled to said memory bus and iv) a processor bus coupling said internal memory and said external memory interface to said embedded processor, wherein said external memory is arranged to store, at a chosen address, an N-bit data word having a value representative of its size, equal to N/M bits, and of the Endian form of the stored program data, and in that it also comprises a configuration means coupled to said embedded processor and to said external memory interface and arranged to deduce from at least one part of M bits of said N-bit data word, read by said external memory interface at the chosen address of said external memory, the size and the Endian form of storage of said external memory and to set the width of said external memory interface according to said deduced external memory size and a data processing mode of said embedded processor according to said deduced Endian form of storage, and wherein said configuration means is arranged to generate N/M M-bit accesses to said external memory at consecutive addresses starting from said chosen address to read at least said one part of said N-bit data word.

* * * * *